US009182001B2

(12) United States Patent
Pesek

(10) Patent No.: US 9,182,001 B2
(45) Date of Patent: Nov. 10, 2015

(54) APPARATUS AND METHOD FOR THE VIBRATION CONTROL OF A RISING PIPE OF A VERTICAL PUMP

(75) Inventor: Tomas Pesek, Winterthur (CH)

(73) Assignee: Sulzer Management AG, Winterthur (CH)

( * ) Notice: Subject to any disclaimer, the term of this patent is extended or adjusted under 35 U.S.C. 154(b) by 286 days.

(21) Appl. No.: 13/229,416

(22) Filed: Sep. 9, 2011

(65) Prior Publication Data

US 2012/0067449 A1 Mar. 22, 2012

(30) Foreign Application Priority Data

Sep. 17, 2010 (EP) .................................... 10177472

(51) Int. Cl.
| F16L 3/00 | (2006.01) |
| F16F 7/104 | (2006.01) |
| F04D 13/08 | (2006.01) |
| F04D 29/043 | (2006.01) |
| F04D 29/66 | (2006.01) |

(52) U.S. Cl.
CPC ............... F16F 7/104 (2013.01); F04D 13/08 (2013.01); F04D 29/043 (2013.01); F04D 29/669 (2013.01)

(58) Field of Classification Search
CPC ..... F04D 29/66; F04D 29/668; F04D 29/669; F04D 29/043; F04D 13/08; F16F 7/104; F16F 7/116
USPC .................. 138/106, 120, 155, 172; 248/636, 248/49–74.5, 560–635; 405/211
See application file for complete search history.

(56) References Cited

U.S. PATENT DOCUMENTS

| 2,172,130 | A | * | 9/1939 | Powell | 138/110 |
| 3,248,886 | A | * | 5/1966 | Blenkarn | 405/211 |
| 3,565,374 | A | * | 2/1971 | Jones | 248/74.3 |
| 4,110,994 | A | * | 9/1978 | Lundh | 405/158 |
| 4,298,295 | A | * | 11/1981 | Bozzo et al. | 405/52 |
| 4,453,693 | A | * | 6/1984 | Krux | 248/559 |
| 4,497,342 | A | * | 2/1985 | Wenzel et al. | 137/565.17 |
| 5,020,978 | A | * | 6/1991 | Nashif | 417/363 |
| 5,549,417 | A | * | 8/1996 | Ju et al. | 405/211 |
| 8,182,176 | B2 | * | 5/2012 | Bailey et al. | 405/223.1 |

FOREIGN PATENT DOCUMENTS

| DE | 30 25 587 A1 | 10/1982 |
| JP | 57-43037 A | 3/1982 |
| JP | 2002-5097 A | 1/2002 |

* cited by examiner

*Primary Examiner* — Daniel R Shearer
*Assistant Examiner* — Nicholas J Weiss
(74) *Attorney, Agent, or Firm* — Kilpatrick Townsend & Stockton LLP

(57) ABSTRACT

An apparatus (10) for the vibration control of a rising pipe (3) of a vertical pump is presented which riser pump is excited to vibrations in operation and which has a longitudinal direction. The apparatus (10) is outwardly positionable at the rising pipe and includes a vibration element (7.1, 7.2), one or more spring elements (8.1-8.4) and a guide, wherein the vibration element has an opening to surround the rising pipe (3) and is movably and elastically held by the spring element or elements (8.1-8.4), and wherein the vibration element (7.1, 7.2) is guided by guide such that the movements of the vibration element in operation are restricted to movements in a plane perpendicular to the longitudinal direction of the rising pipe.

7 Claims, 5 Drawing Sheets

Figure 1:
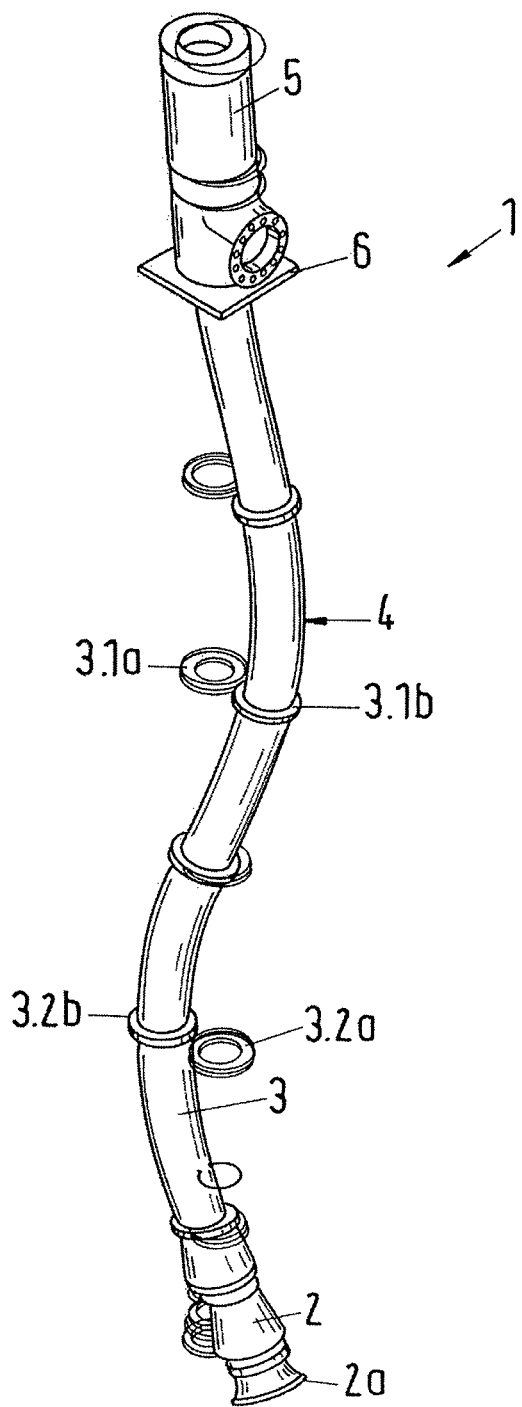

APPARATUS AND METHOD FOR THE VIBRATION CONTROL OF A RISING PIPE OF A VERTICAL PUMP

CROSS-REFERENCE TO RELATED APPLICATIONS

This application claims the priority of European Application No. 10 177 472.7, filed on Sep. 17, 2010, the disclosure of which is incorporated herein by reference.

The invention relates to an apparatus for the vibration control of a riser pipe of a vertical pump in accordance with the preamble of claim 1 and to a method for vibration control of a rising pipe of a vertical pump in accordance with the preamble of claim 10.

To convey liquid media from tanks and from removal positions disposed below the liquid level, vertical pumps are frequently used which are lowered into the tank or down to the removal position. The outlet of the vertical pump is as a rule connected to a rising pipe through which the medium to be conveyed is forwarded. The pump drive can, as usual with immersion pumps, be arranged at the vertical pump or at an upper part of the rising pipe, wherein in this case the drive is connected to the vertical pump via a drive shaft arranged in the interior of the rising pipe. The vertical pump or the rising pipe or the drive can be fastened to the tank base or to the tank wall or tank top or one or more fastening devices are provided which are typically arranged spaced apart from the removal position.

The rising pipe or the total pump structure can be stimulated to vibrations by periodic or stochastic stimulation forces which arise during the pump operation, said vibrations being particularly disturbing when the frequency of the vibrations is disposed in the vicinity of a resonant or natural frequency of the rising pipe or of the pump structure respectively. With a vertical pump having a rising pipe, main vibrations are as a rule horizontal or radial respectively to the longitudinal direction of the rising pipe having one or a plurality of pronounced maxima and minima along the rising pipe. In addition, the direction of the vibrations can change over time in a horizontal plane or respectively in a plane perpendicular to the longitudinal direction of the rising pipe.

Document JP 2002 005097 A describes a system for preventing vibrations for a vertical shaft pump. The drive of the pump is installed on a platform from where the pump hangs into a tank at a rising pipe. The system for preventing vibrations is equipped with a vibration damper which is arranged between the lower part of the pump and the tank base and absorbs the vibrations of the pump and with a slide cylinder which connects the vibration damper to the tank base. This system has the disadvantage that it can only be used when a tank base or another base surface is available directly beneath the pump.

It is the object of the invention to provide an apparatus and a method for vibration control of a rising pipe of a vertical pump which can be attached to the rising pipe at any time without changes being necessary to the rising pipe or to the pump construction and which can also be used when no anchorage points such as a container base are available in the vicinity of the pump.

This object is satisfied in accordance with the invention by the apparatus defined in claim 1 and by the method defined in claim 10.

The apparatus in accordance with the invention for the vibration control of a rising pipe of a vertical pump, which rising pipe is excited to vibrations in operation and which has a longitudinal direction, is characterised in that the apparatus can be positioned outwardly at the rising pipe or outwardly at the vertical pump; in that the apparatus includes a vibration element, one or more spring elements and a guide; in that the vibration element has an opening to surround the rising pipe or the vertical pump and is held movably and elastically by the spring element or elements; and in that the vibration element is guided by the guide such that the movements of the vibration element are restricted in operation to movements in a plane perpendicular to the longitudinal direction of the rising pipe. The vibration element can be configured, for example, in ring shape, wherein the axis of the vibration element is typically arranged parallel to the longitudinal direction of the rising pipe in operation.

In an advantageous embodiment, the apparatus additionally includes a holder to fasten the apparatus to the rising pipe, wherein the vibration element is elastically connected to the holder via the spring element or elements.

The apparatus and/or the vibration element and/or the holder is/are advantageously made up of at least two parts or two halves which can be joined together in order subsequently to fasten the apparatus to the rising pipe.

Independently of the embodiment, the apparatus typically includes three or four or more spring elements.

In a further advantageous embodiment, the spring elements are configured as resilient bars which are advantageously arranged substantially parallel to the longitudinal direction of the rising pipe in operation. The resilient bars are typically arranged parallel to the axis of the vibration element when it is configured in ring shape.

In a further advantageous embodiment, the apparatus additionally includes one or more damping elements which are connected to the vibration element and/or to the holder.

The invention further includes a rising pipe for a vertical pump which rising pipe is provided with one or more apparatus in accordance with one or more of the above-described embodiments and variants and also includes a vertical pump having a rising pipe which is provided with one or more apparatus in accordance with one or more of the above-described embodiments and variants.

In the method in accordance with the invention for the vibration control of a rising pipe of a vertical pump, the rising pipe is excited to vibrations in operation, wherein the rising pipe has a longitudinal direction. In the method, a vibration element is provided for vibration control which surrounds the rising pipe and which is held movably and elastically with respect to the same by one or more spring elements, wherein the vibration element is guided by a guide which restricts the movements of the vibration element to movements in a plane perpendicular to the longitudinal direction of the rising pipe, and wherein the vibration element and the spring element or elements and the guide are arranged outwardly at the rising pipe.

In the method, a holder is advantageously provided to fasten the spring element or elements and/or the guide to the rising pipe, wherein the vibration element is elastically connected to the holder via the spring element or elements.

In an advantageous embodiment of the method, the vibration element and the spring element or elements have a mass or a spring constant respectively and the mass of the vibration element and the spring constant of the spring element or elements are selected such that the vibration amplitude or amplitudes of the rising pipe are reduced.

In a further advantageous embodiment of the method, the rising pipe in connection with the vibration element or respectively the vertical pump having the rising pipe in connection with the vibration element has two natural frequencies, wherein the mass of the vibration element and the spring constant of the spring element or the sum of the spring constants of the spring elements are selected so that the difference between the respective natural frequency and the resonant frequency of the rising pipe without vibration control or respectively of the vertical pump having the rising pipe without vibration control amounts to at least 10% or at least 20% of the named resonant frequency of the rising pipe.

Independently of the embodiments and variants described above, the vibration of the rising pipe can additionally be damped by one or more damping elements which are connected to the vibration element.

The apparatus in accordance with the invention and the method in accordance with the invention for the vibration control of a rising pipe of a vertical pump have the advantage that no additional contact points and support points are necessary for the vibration control and the apparatus can subsequently be attached to any desired point of the rising pipe. The effect is particularly advantageous when the vibration element provided in the apparatus and in the method is attached in a region of the rising pipe or of the vertical pump in which the vibration amplitude has a maximum.

The guide provided in the apparatus and in the method furthermore has the advantage that unwanted vibrations of the vibration element are avoided and the vibration control of the rising pipe is thereby simplified and improved.

The above description of embodiments and variants only serves as an example. Further advantageous embodiments can be seen from the dependent claims and from the drawing. Furthermore, individual features from the embodiments and variants described or shown can also be combined with one another within the framework of the present invention to form new embodiments.

Figure 2:
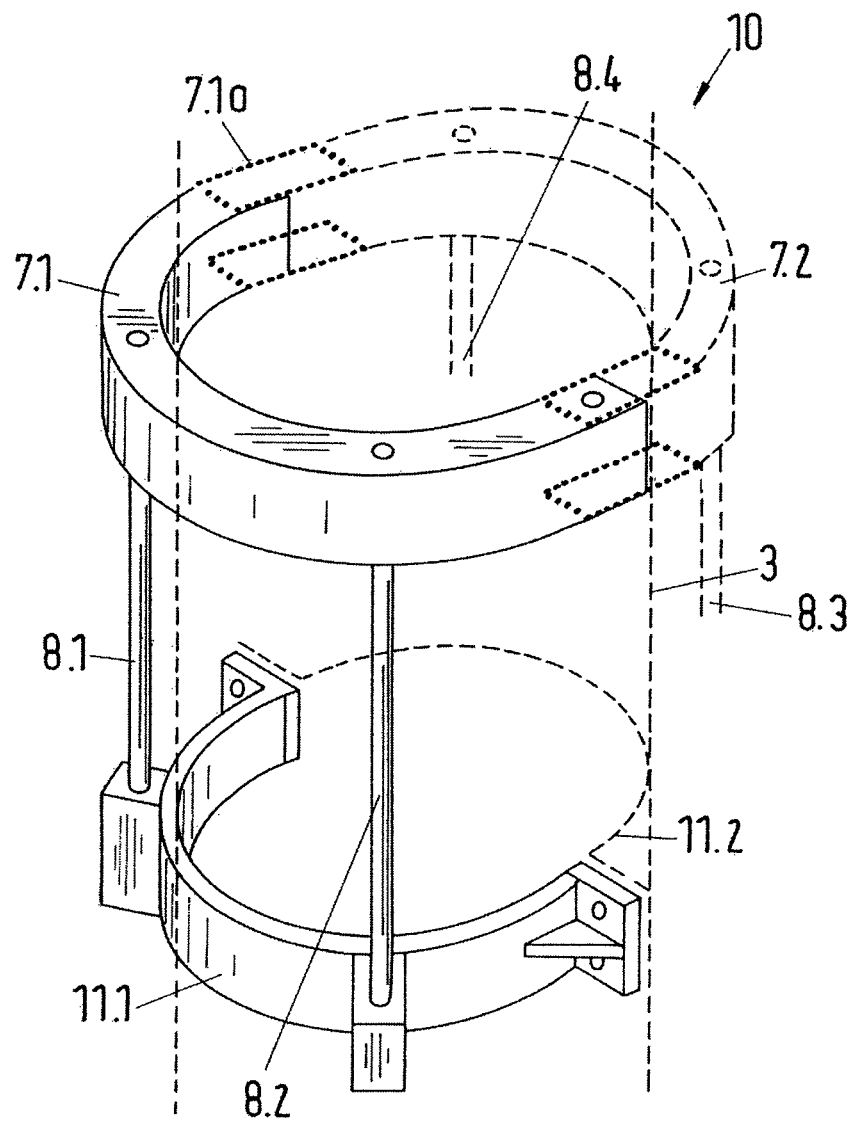
Figure 2A:
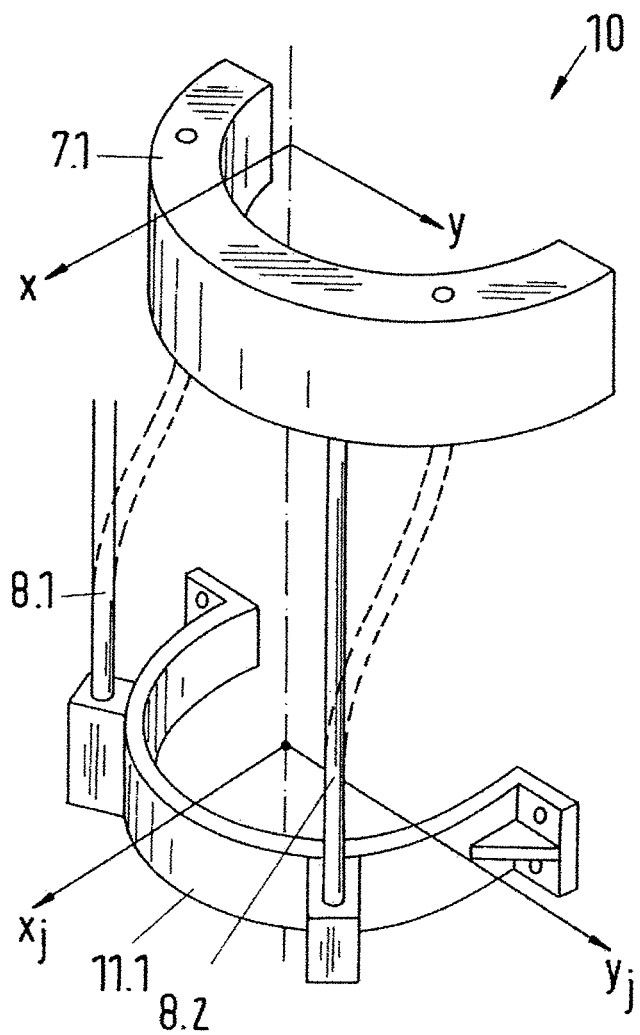
Figure 3:
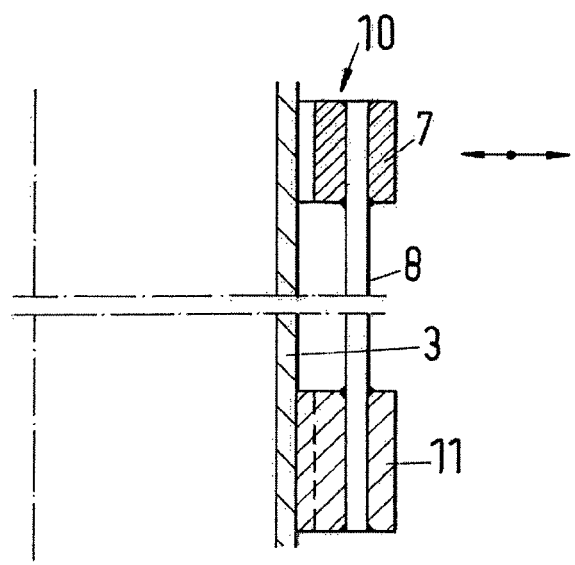
Figure 4A:
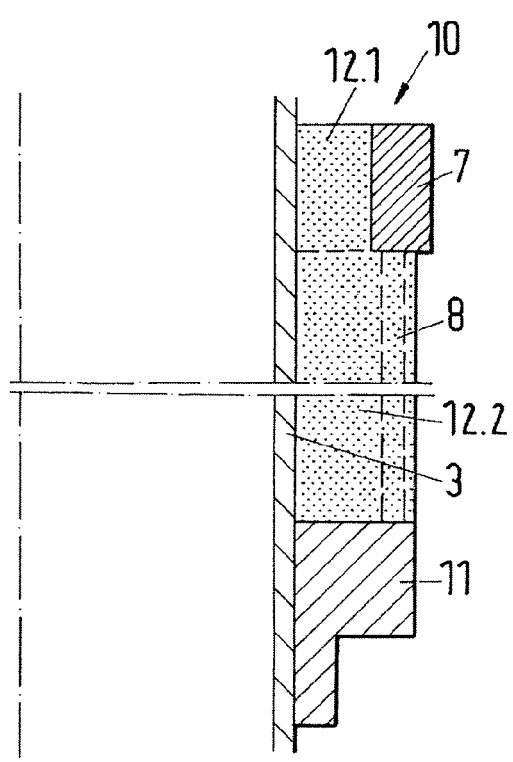
Figure 4B:
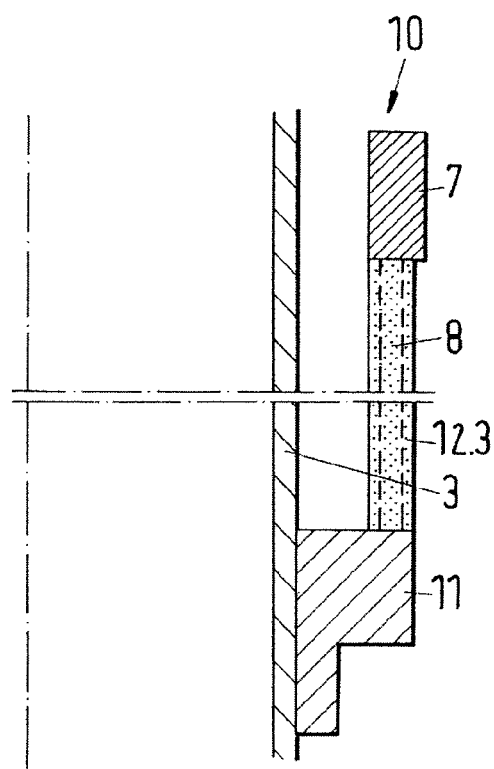
Figure 5:
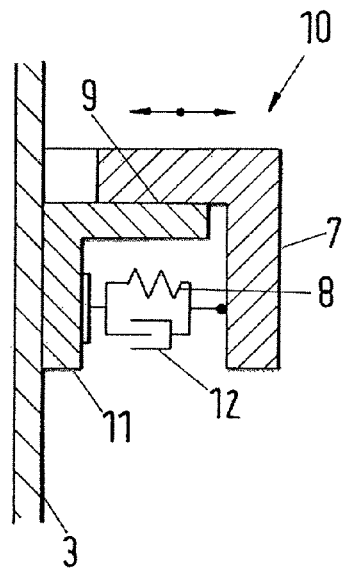
Figure 6:
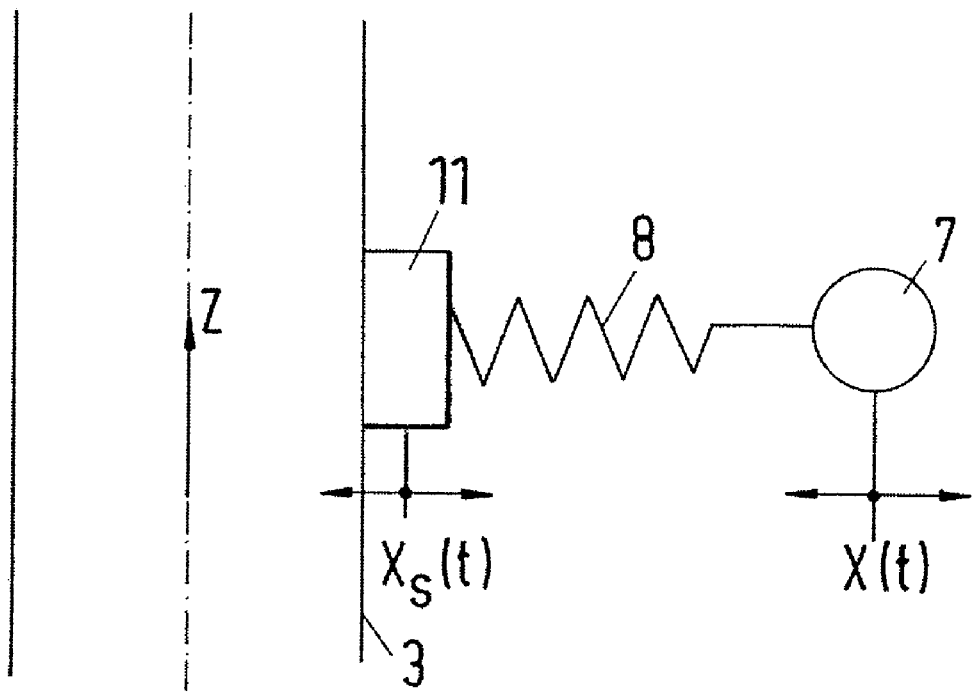

The invention will be explained in more detail in the following with reference to the embodiments and to the drawing. There are shown FIG. 1 a vibration state of a conventional vertical pump with a vibrating rising pipe;

FIG. 2 an exemplary apparatus in accordance with the present invention;

FIG. 2A one exemplary embodiment of the apparatus of FIG. 2 with a vibration element in the deflected state;

FIG. 3 a cross-section through the embodiment of FIG. 2;

FIGS. 4A, 4B two alternative embodiments of a damping element for use with the apparatus of FIG. 2;

FIG. 5 an enlarged schematic view of a portion of an exemplary embodiment in cross-section; and FIG. 6 a schematic representation of a model for an apparatus in accordance with the present invention.

FIG. 1 shows a vibration state of a conventional vertical pump 2 having a rising pipe 3. The vertical pump in the arrangement 1 shown moreover includes a drive 5 which is installed on a fastening platform 6. The pump 2 at the rising pipe can be hung from the fastening platform into a tank, not shown, or can be lowered to a removal position. Where required, the inlet of the vertical pump can moreover be provided with a suction funnel 2a. The arrangement 1 shown in FIG. 1 is only supported via the fastening platform 6, whereas the vertical pump 2 and the rising pipe have no additional supports. The vibration state of the rising pipe shown in FIG. 1 was calculated by means of modal analysis using finite element analysis (FEA). The markings 3.1a, 3.2a correspond in this respect to the position of rest of the rising pipe, whereas the reference numerals 3.1b, 3.2b designate the corresponding points of the rising pipe in the shown vibration state. The vibration amplitude reaches a maximum 4 in the arrangement shown in FIG. 1 after around a third of the rising pipe length, measured from the fastening platform.

FIGS. 2 and 3 show an exemplary apparatus 10 in accordance with the invention for the vibration control of a rising pipe 3 of a vertical pump, wherein the rising pipe has a longitudinal direction and is excited to vibrations in operation. The apparatus 10 is outwardly positionable at the rising pipe 3 or on a case by case basis outwardly at the vertical pump and includes a vibration element 7, 7.1, 7.2, one or more spring elements 8, 8.1-8.4 and an optional guide 9 (FIG. 5), wherein the vibration element has an opening to surround the rising pipe 3 and is movably and elastically held by the spring element or elements. In the first embodiment of FIG. 5, the vibration element 7, 7.1, 7.2 is guided by the guide 9 such that the movements of the vibration element in operation are restricted to movements in a plane perpendicular to the longitudinal direction of the rising pipe. The vibration element can be configured, for example, as shown in FIG. 2, in ring shape, wherein the axis of the vibration element is typically arranged parallel to the longitudinal direction of the rising pipe in operation.

In an advantageous embodiment, the apparatus 10 additionally includes a holder 11, 11.1, 11.2 to fasten the apparatus to the rising pipe 3, wherein the vibration element 7, 7.1, 7.2 is elastically connected to the holder via the spring element or elements 8, 8.1-8.4.

The apparatus 10 and/or the vibration element 7.1, 7.2 and/or the holder 11.1, 11.2, as shown in FIG. 2, is/are advantageously made up of at least two parts or two halves which can be joined together in order subsequently to fasten the apparatus to the rising pipe 3. The parts 7.1, 7.2 of the vibration element can be joined together, for example, by means of tabs 7.1a, whereas the holder 11.1, 11.2 can be configured as a two-part pipe clamp.

Independently of the embodiment or variant, the apparatus typically includes three or four or more spring elements 8, 8.1-8.4 which are normally arranged uniformly distributed, i.e. in respectively equal angular intervals, over the periphery of the holder 11, 11.1, 11.2.

In some embodiments, the spring elements 8, 8.1-8.4 are, configured as resilient bars which are advantageously arranged substantially parallel to the longitudinal direction of the rising pipe 3 in operation. The resilient bars are typically arranged parallel to the axis of the vibration element 7, 7.1, 7.2 when it is configured in ring shape. The embodiment of the spring elements as resilient bars has the advantage that they do not only act as spring elements 8.1-8.4, but that the resilient bars can also be used as a guide which restricts the orientation of the vibration element in operation to always be disposed in a plane perpendicular to the longitudinal direction of the rising pipe. If three or more resilient bars are provided which are aligned in parallel, are of equal length and are distributed over the periphery of the holder 11.1, 11.2 so that the angular interval between adjacent bars is not larger than 150°, the bars act, on deflections of the vibration element 7.1, 7.2, as a parallelogram guide which prevents tilt movements with respect to the longitudinal direction of the rising pipe, i.e. keeps the vibration element oriented in a plane perpendicular to the longitudinal direction.

In a further advantageous embodiment, the apparatus 10 additionally includes one or more damping elements which are connected to the vibration element 7 and/or to the holder 11. FIGS. 4A and 4B show embodiment variants for damping elements 12.1, 12.2, 12.3 for the embodiment of FIG. 2. Reference is made to the aforesaid description of FIGS. 2 and 3 with respect to details and embodiments with regard to the apparatus 10. A damping element 12.1 can, for example, as shown in FIG. 4A, be arranged between the rising pipe 3 and the vibrational mass 7. The damping element 12.1 can in this respect be configured as a concentric ring or can include a plurality of separate damping elements which are distributed over the inner side of the vibration element facing the rising pipe. In this case, the damping elements 12.1 are typically uniformly distributed over the periphery of the rising pipe.

However, the damping element can also, as shown in FIG. 4A, be configured as a pipe 12.2 which is arranged concentrically to the rising pipe and which partly or completely envelops the spring elements 8 when required. The damping element can further, as shown in FIG. 4B, be configured as a sleeve 12.3 which is arranged concentrically to the rising pipe and which partly or completely envelops the spring elements 7.

The above-described embodiment variants for damping elements can be used individually or as a combination of two or three of the embodiment variants. The damping elements 12.1, 12.2, 12.3 advantageously contain a damping material or a damping structure, for example a foam, which is soaked and preferably surrounded by a viscous liquid, or a wire fabric or wire net which can be enveloped as required.

FIG. 2A shows an embodiment of the apparatus with a vibration element 7.1 in the deflected state, wherein the apparatus 10 shown there includes two halves, of which only one half is shown in FIG. 2A, for the vibration control of a rising pipe of a vertical pump. The half not shown is structured with mirror symmetry and deflected, as shown in FIG. 2A in the same direction with respect to the position of rest. In FIG. 2A, the coordinate axes X and Y are moreover indicated for the position of the vibration element 7.1 with respect to the position of rest of the rising pipe and the coordinate axes $x_j$ and $Y_j$ are indicated for the point of the rising pipe to which the holder 11.1 is fastened.

FIG. 5 shows further detail of an embodiment of the apparatus 10. The apparatus 10 is, as shown in FIG. 5, outwardly positionable at the rising pipe 3 and includes a vibration element 7, one or more spring elements 8 and a guide 9, wherein the vibration element has an opening to surround the rising pipe 3 and is movably and elastically held by the spring element or elements, and wherein the vibration element 7 is guided by the guide 9 such that the movements of the vibration element in operation are restricted to movements in a plane perpendicular to the longitudinal direction of the rising pipe. The vibration element 7 is typically provided, as in FIG. 5, with a circular opening which can be arranged concentrically to the rising pipe in the state of rest. The vibration element 7 advantageously includes an axially extending part, for example, a cylindrical part, and a radially extending part, for example in the form of a ring-shaped plate, which is connected to the axially extending part.

As was mentioned earlier, the spring elements 8, 8.1-8.4 are, in some embodiments, configured as bars, which themselves act as a guide, so no further guide 9 is necessary. As was mentioned earlier, the bars are aligned in parallel, and are of equal length to act as a parallelogram guide. In other words, the elongation and compression of the bars in the Z direction is negligible, so that the bars are always of equal lengths to thereby define a parallelogram in a plane perpendicular to the longitudinal direction of the rising pipe. In other words, movements of the vibration element 7 are restricted to movements in a plane perpendicular to the longitudinal direction of the rising pipe.

In an advantageous embodiment, the apparatus 10 additionally includes a holder 11 with which the apparatus can be fastened to the rising pipe 3, wherein the vibration element 7 is elastically connected to the holder via the spring element or elements 8. In an advantageous embodiment variant, the holder 11 is, as shown in FIG. 5, simultaneously configured as a guide, for example in that one or more radially extending guide surfaces 9 are provided at the holder to restrict the movements of the vibration element 7 in operation to movements in a plane perpendicular to the longitudinal direction of the rising pipe. The guide surface or surfaces 9 can be configured as slide surfaces, for example in that they are provided with a slidable support, for example a Teflon support.

The apparatus 10 and/or the vibration element 7 and/or the holder 11 is/are advantageously made up of at least two parts or two halves which can be joined together in order subsequently to fasten the apparatus to the rising pipe 3. The parts of the vibration element can be joined together, for example, by means of tabs, whereas the holder 11.1, 11.2 can be configured as a two-part pipe clamp.

Independently of the embodiment or variant, the apparatus can include three or four or more spring elements 8 which are pre-tensioned as required and are normally arranged uniformly distributed, i.e. at respectively equal angular intervals, over the periphery of the holder 11. It is, however, also possible to provide an elastic deformable ring as the spring element which is arranged between the vibration element 7 and the holder 11.

In a further advantageous embodiment, the apparatus 10 additionally includes one or more damping elements 12 which are connected to the vibration element 12 and/or to the holder 11. Three or four or more spring/damping elements can be provided, for example, which are typically arranged uniformly distributed, i.e. at respective equal angular intervals, over the periphery of the holder 11. It is, however, also possible to provide a viscoelastic ring as the spring/damping element which is arranged between the vibration element 7 and the holder 11 and which can, for example, contain a wire fabric filled with viscous liquid. In addition to these possibilities or instead of them, the guide or the guide surfaces 9 can be used as damping elements in that they are provided with a controlled friction, for example.

The invention furthermore includes a rising pipe 3 for a vertical pump which rising pipe is provided with one or more apparatus 10 in accordance with one or more of the above-described embodiments and variants and also includes a vertical pump having a rising pipe 3, said rising pipe and said vertical pump having a rising pipe being provided with one or more apparatus 10 in accordance with one or more of the above-described embodiments and variants.

The method in accordance with the invention for the vibration control of a rising pipe of a vertical pump will be described in the following with reference to FIGS. 2, 2A and 3. In the method, the rising pipe 3 is excited to vibrations in operation, wherein the rising pipe has a longitudinal direction. For the vibration control, a vibration element 7, 7.1, 7.2 is provided which surrounds the rising pipe 3 and which is movably and elastically held with respect thereto by one or more spring elements 8, 8.1-8.4, wherein the vibration element 7, 7.1, 7.2 is guided by a guide 9 which restricts the movements of the vibration element to movements in a plane perpendicular to the longitudinal direction of the rising pipe 3, and wherein the vibration element 7, 7.1, 7.2 and the spring element or elements 8, 8.1-8.4 and the guide 9 are outwardly arranged at the rising pipe.

In the method, a holder 11, 11.1, 11.2 is advantageously provided by which the spring element or elements 8, 8.1-8.4 and/or the guide are fastened to the rising pipe 3, wherein the vibration element 7, 7.1, 7.2 is elastically connected to the holder 11, 11.1, 11.2 via the spring element or elements 8, 8.1-8.4.

In an advantageous embodiment of the method, the vibration element 7, 7.1, 7.2 and the spring element or elements 8,

8.1-8.4 have a mass m or a spring constant k respectively and the mass m of the vibration element and the spring constant k of the spring element or elements are selected such that the vibration amplitude or amplitudes of the rising pipe 3 are reduced.

In a further advantageous embodiment of the method, the rising pipe 3 in connection with the vibration element or respectively the vertical pump having the rising pipe in connection with the vibration element 7, 7.1, 7.2 has two natural frequencies $f_1$, $f_2$, wherein the mass m of the vibration element and the spring constant k of the spring element or the sum of the spring constants of the spring elements are selected so that the difference $\Delta f$ between the respective natural frequency $f_1$, $f_2$ and the original resonant frequency $f_m$ of the rising pipe without vibration control amounts to at least 10% or at least 20% of the named resonant frequency $f_m$ of the rising pipe.

The design of the apparatus for the vibration control of a rising pipe of a vertical pump and specifically the determination of the mass m of the vibration element and of the spring constant k of the spring elements typically includes two steps. In a first step, the vibration behaviour of the rising pipe is determined without vibration control and in a second step, the vibration behaviour of the rising pipe with vibration control.

The original vibration behaviour of the rising pipe without a vibration control can be dynamically characterised by the resonant frequency, i.e. the rising pipe is understood as a mass vibrator having the modal parameter equation $$M_m \cdot \ddot{q} + K_m \cdot q = \sum_j \alpha_{m,j} \cdot F_j(t)$$

and the modal parameters
  $M_m$=modal mass of the vertical pump having a rising pipe
  $K_m$=modal stiffness of the vertical pump having a rising pipe
  $\alpha_{m,j}$=eigenvector (displacement or rotation) at the point j of the rising pipe at which the force $F_j(t)$ is effective
  $F_j(t)$=external excitation force or torque which acts on the rising pump at the point j
and q(t)=generalised coordinate The modal parameters $M_m$, $K_m$, $\alpha_{m,j}$ can be determined by means of classical modal analysis, i.e. by means of vibration stimulation of the rising pipe and measurement of the vibration response or purely mathematically by means of finite element analysis (FEA) of the rising pipe.

The original resonant frequency $f_m$ of the rising pipe without vibration control can be calculated from the modal parameters $M_m$ and $K_m$ determined in this manner using the following formula:

$$f_m = \frac{1}{2\pi}\sqrt{\frac{K_m}{M_m}}$$

The following model, which will be explained in more detail in the following with reference to FIG. 6, can be used for the determination of the vibration behaviour of the rising pipe. The model includes a rising line 3 having a longitudinal direction or an axial direction Z a holder 11 which is fastened to the rising line, a spring element 8 having the spring constant k and a vibration element 7 having the mass m which is coupled to the holder via the spring element. In FIG. 6, no guide is drawn which limits the movements of the vibration element 7 in operation to movements in a plane perpendicular to the longitudinal direction of the rising pipe.

Instead, the Z coordinate of the vibration element is set equal to zero in the model, i.e. the model assumes that no movement of the vibration element in the Z direction occurs.

The vibrations of the vibration element 7 are characterised by the functions X(t) and Y(t), whereas the vibrations of the holder 11 at the position j of the rising pipe are given by the functions $X_s(t)$ und $Y_s(t)$. The functions $X_s(t)$ und $Y_s(t)$ can be transformed as follows in this respect:

$$X_s(t)=X_j \cdot q(t) \text{ and } Y_s(t)=Y_j \cdot q(t)$$

where $X_j$, $Y_j$=standardised displacement at the point j of the rising pipe without vibration control
  q(t)=generalised movement coordinate for the rising pipe without vibration control For reasons of simplicity, only the vibrations $X_s(t)$ und X(t) of the vibration element 7 and of the holder 11 are shown in the X direction in FIG. 6.

If no external forces act on the rising pipe equipped with the vibration element 7 and if the mass $m_s$ of the holder 11 is taken into account, the following freely vibrating system is obtained for the model:

$$\begin{bmatrix} M_m^* & 0 & 0 \\ 0 & m & 0 \\ 0 & 0 & m \end{bmatrix}\begin{pmatrix} \ddot{q} \\ \ddot{X} \\ \ddot{Y} \end{pmatrix} + \begin{bmatrix} K_m^* & -k \cdot X_j & -k \cdot Y_j \\ -k \cdot X_j & k & 0 \\ -k \cdot Y_j & 0 & k \end{bmatrix}\begin{pmatrix} q \\ X \\ Y \end{pmatrix} = 0$$

with the auxiliary parameters $$M_m^* = M_m + m_s \cdot (X_j^2 + Y_j^2)$$

$$K_m^* = K_m + k_s \cdot (X_j^2 + Y_j^2)$$

and the modal parameters
  $M_m$=modal mass of the vertical pump with rising pipe
  $K_m$=modal stiffness of the vertical pump having a rising pipe
  $X_j$, $Y_j$=standardised displacements or on a case by case basis, rotations at the point j of the rising pipe to which the vibrating element is fastened
and
  q(t)=generalised movement coordinate
  $m_s$=mass of the holder
  m=mass of the vibration element
  k=spring constant of the spring element The natural frequencies $f_1$, $f_2$ of the above system are expediently determined for the design of the vibration control. They result from the conditional equation:

$$\omega^4 - \left(\frac{K_m^*}{M_m^*} + \frac{k}{m}\right)\omega^2 + \frac{k}{m}\left(\frac{K_m^*}{M_m^*} - \frac{k}{M_m^*}(X_j^2 + Y_j^2)\right) = 0$$

where $\omega$=circular frequency of the system

This conditional equation has two positive solutions $\omega_1^2$ and $\omega_2^2$, from which the natural frequencies $f_1$, $f_2$ can be determined using the relationships $$f_1 = \frac{1}{2\pi}\omega_1 \text{ and } f_2 = \frac{1}{2\pi}\omega_2$$

For the design of the vibration control and specifically to suppress the natural frequencies, the modal mass $M_m$ is required of the vertical pump having the rising pipe, the modal stiffness $K_m$ and the displacements $X_j, Y_j$ at the point j of the rising pipe to which the vibration element is fastened as well as the mass m of the vibration element 7, the spring constant k of the spring element 8 and, on a case by case basis, the mass $m_s$ of the holder 11. The parameters m, k, and $m_s$ are advantageously selected or adapted so that the resonance is suppressed at the original resonant frequency $f_m$ of the rising pipe; and the frequency interval between the respective natural frequency $f_1$, $f_2$ and the original resonant frequency $f_m$ of the rising pipe or, on a case by case basis, the stimulation frequency is large enough.

These conditions are normally satisfied when the frequency interval between the respective natural frequency $f_1$, $f_2$ and the original resonant frequency $f_m$ of the rising pipe or, on a case by case basis, of the stimulation frequency amounts to at least 10% or at least 20% of the named resonant frequency $f_m$ of the rising pipe or of the stimulation frequency respectively.

To keep the mass m of the vibration element (7) small, it is moreover advantageous to attach the vibration element in a region of the rising pipe 3 or of the vertical pump in which the vibration amplitude has a maximum.

Independently of the embodiments and variants described above, the vibrations of the rising pipe 3 can additionally be damped by one or more damping elements 12, 12.1-12.3 which are connected to the vibration element 7, 7.1, 7.2. Damping elements are above all advantageous when the rising pipe or the vertical pump having the rising pipe is stimulated by stochastic or periodic stimulation forces which have a larger frequency bandwidth and which also include the natural frequencies $f_1$, $f_2$. In this case, the resonances at the natural frequencies $f_1$, $f_2$ cannot be avoided. Thanks to the damping elements, it is possible effectively to damp the resonances at the natural frequencies $f_1$, $f_2$.

The described embodiments and variants of the apparatus in accordance with the invention and of the method in accordance with the invention for the vibration control of a rising pipe of a vertical pump have the advantage that disturbing vibrations can be suppressed or damped in a wide frequency range and that, for this purpose, no additional contact points or support points are required besides the originally provided support of the rising line and/or of the vertical pump. The guide provided in the apparatus and in the method furthermore has the advantage that unwanted vibrations of the vibration element are avoided and the vibration control of the rising pipe is thereby improved.

The invention claimed is:

1. An apparatus for the vibration control of a rising pipe of a vertical pump, wherein the rising pipe is excited to vibrations in operation and wherein the rising pipe has a longitudinal direction, wherein the apparatus is configured to be fastened outwardly at the rising pipe; wherein the apparatus comprises:

a vibration element; and three or more spring elements, wherein the spring elements are resilient bars which are oriented substantially parallel to the longitudinal direction of the rising pipe in operation, wherein a first end of each bar is attached to the vibration element, wherein the first ends of the three or more spring elements define a polygon disposed in a plane perpendicular to the longitudinal direction of the rising pipe, wherein a second end of each bar is configured to be attached to a holder, the holder being configured to fasten the apparatus to the rising pipe, such that, when the second ends of the bars are attached to the holder, the vibration element is elastically connected to the holder, wherein each of the spring elements is further configured to guide the vibration element with respect to the holder;

wherein the vibration element comprises an opening configured to surround the rising pipe, wherein the vibration element is held by the first ends of the spring elements; and wherein the vibration element is guided by the spring elements such that movements of the vibration element with respect to the holder are substantially restricted to movements in the plane perpendicular to the longitudinal direction of the rising pipe.

2. An apparatus in accordance with claim 1, further comprising the holder, wherein the vibration element is elastically connected to the holder via the spring elements.

3. An apparatus in accordance with claim 1, wherein the vibration element is ring-shaped.

4. An apparatus in accordance with claim 1, wherein the vibration element is made up of at least two parts which can be joined together.

5. An apparatus in accordance with claim 1, further comprising one or more damping elements connected to the vibration element.

6. A rising pipe for a vertical pump which rising pipe is provided with one or more apparatus in accordance with claim 1.

7. A vertical pump having a rising pipe, said vertical pump and said rising pipe being provided with one or more apparatus in accordance with claim 1.

* * * * *